July 13, 1954 G. H. IKERT 2,683,468
HOSE SUPPORT
Filed March 4, 1948 2 Sheets-Sheet 1
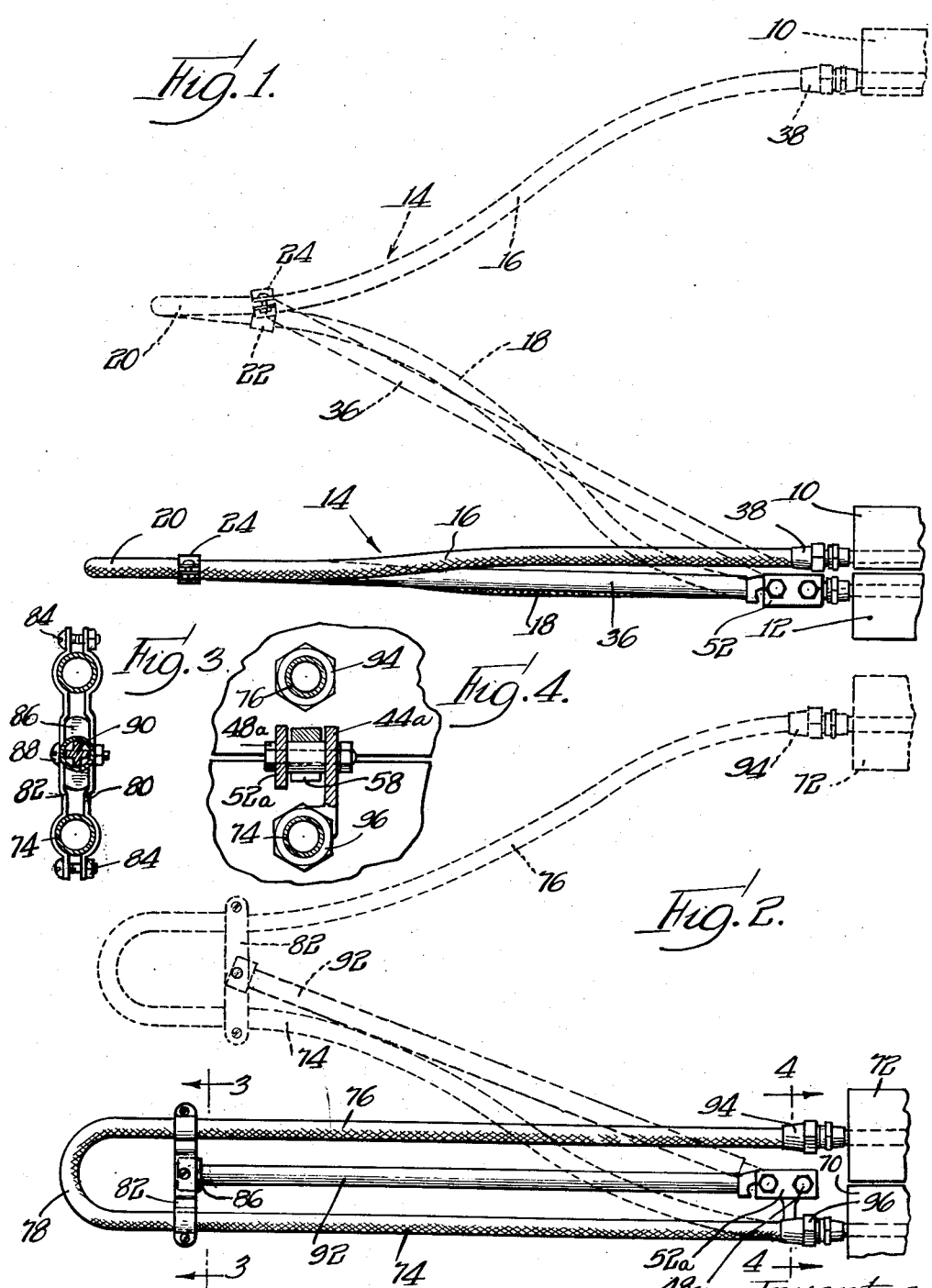
Inventor
George H. Ikert
By: Moore, Olson & Trexler
attys.

July 13, 1954
G. H. IKERT
2,683,468
HOSE SUPPORT
Filed March 4, 1948
2 Sheets-Sheet 2
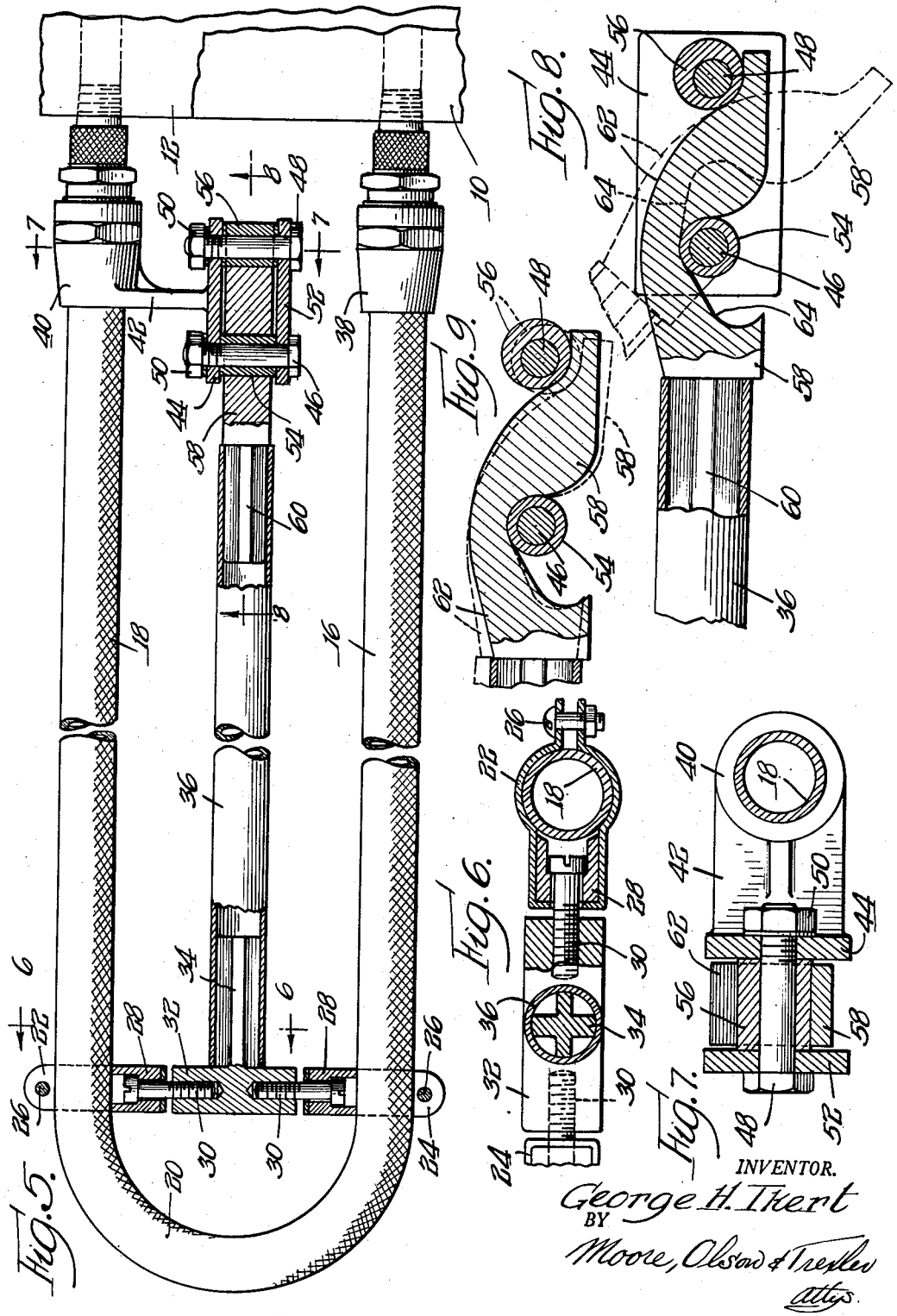
INVENTOR.
George H. Ikert
BY
Moore, Olson & Trexler
Attys.

Patented July 13, 1954

2,683,468

UNITED STATES PATENT OFFICE 2,683,468

HOSE SUPPORT

George H. Ikert, Elgin, Ill., assignor to Chicago Metal Hose Corporation, Maywood, Ill., a corporation of Illinois Application March 4, 1948, Serial No. 12,979

7 Claims. (Cl. 138—61)

This invention relates to hose supports, and concerns particularly hose supports for the shiftable hose connections of certain types of machinery, for maintaining the hose in self-draining position.

In various types of machinery, such for example as platen presses and the like, it is necessary to transmit fluids between machine elements which are shiftable relative to each other. Such fluid transmission may be effected by flexible hose interconnections between the parts, the hose being of sufficient length and so arranged as to permit the necessary relative movements while maintaining the fluid-tight connections.

It is desirable, in such installations, that means be provided for maintaining all parts of the hose in self-draining position at all times and in all positions of the relatively shiftable connected machine parts. By such means it is insured that pockets will not be formed in the hose within which fluids may collect, for example when the machine is out of service, leading to premature deterioration of the hose and other operating difficulties.

Hose supports have heretofore been provided, for installations of the foregoing type, such for example as pantographs and the like for supporting the bight portion of the hose connection in draining position. Such supports, however, have certain inherent difficulties including cost, difficulties in installation, and inefficiency due to wear.

It is an object of the present invention to provide a hose support of improved and simplified construction and improved operating characteristics.

More specifically stated, it is an object of the invention to provide a hose support for use in hose connections for installations as heretofore discussed, wherein the hose is more effectively maintained in draining position, wherein a greater travel of the connected machine parts in respect to hose length is permitted, and wherein the support structure may be more readily adapted to the length, size, and positioning of the hose installation.

A further object of the invention is to provide a hose support, for hose connections of the type defined, wherein the support may be more readily adapted to possible misalignment of the parts to be connected, wherein adjustments may readily be made in the field in accordance with operating requirements and to compensate for wear, and wherein the parts are so arranged as to compensate automatically for hose expansion resulting from internal fluid pressure, heat, or other causes.

A still further object of the invention is to provide a hose support, of the type defined, which may be more readily and economically fabricated and assembled.

Various other objects, advantages and features of the invention will be apparent from the following specification, wherein certain preferred embodiments are set forth for purposes of illustration.

In the drawings, wherein like reference numerals refer to like parts throughout;

Fig. 1 is a general assembly view of a hose connection, for platen presses or the like, including a hose support structure constructed in accordance with and embodying the principles of the invention, in accordance with one preferred embodiment thereof;

Fig. 2 is a view similar to Fig. 1 but illustrating a modified embodiment;

Fig. 3 is an enlarged sectional view of the structure of Fig. 2 taken as indicated by the line 3—3 thereof;

Fig. 4 is an enlarged sectional view of the structure of Fig. 2 taken on the line 4—4 thereof;

Fig. 5 is an enlarged plan view of the installation or embodiment of the invention shown in Fig. 1;

Fig. 6 is a partial sectional view of the structure of Fig. 5, on a further enlarged scale, and taken as indicated by the line 6—6 of Fig. 5;

Fig. 7 is an enlarged partial sectional view of the structure of Fig. 5 on the line 7—7 thereof; and Figs. 8 and 9 are partial longitudinal sectional views, taken as indicated by the line 8—8 of Fig. 5, and more particularly illustrating the details of construction and modes of operation of the structure.

Referring more particularly to the drawings, and first to the structural embodiment illustrated in Figs. 1 and 5–9, an installation is shown providing a flexible hose connection between a pair of relatively shiftable platen press jaws or members 10 and 12, Fig. 1. As will be understood, the parts such as indicated at 10 and 12 may be relatively shiftable machine elements of any type of machine, between which fluid is to be transmitted by means of a flexible hose connection in the operation of the structure. In the particular installation shown the lower press jaw 12 is stationary, whereas the upper press jaw shifts between its lower full line position, and upper dotted line position, as shown in Fig. 1.

The platen jaws are interconnected by means of a flexible tubing or hose 14, the details of which form no part of the present invention. The flexible hose 14 may, for example, comprise flexible metal tubing encased within metal braid, as shown. The hose is disposed so as to provide a pair of generally parallel reaches or lengths 16 and 18 interconnected by a bight portion 20.

The means for interconnecting the hose reaches, adjacent the bight portion 20, is best illustrated in Figs. 5 and 6. It will be seen that this structure comprises a pair of hose clamps 22 and 24 adapted to be clamped into gripping engagement with the hose by suitable means such as screws 26. Each clamp has inset therein a plug member 28 which serves as a support for a bolt 30. The bolts are freely rotatable within the plugs 28, but are arranged for threaded interconnection at their ends with a T-shaped bracket 32, as shown. The extending central portion of the T bracket is cross shaped in section, as indicated at 34, this portion being arranged for free sliding engagement with a tubular support arm 36, the operation of which will be presently described. It will be seen that by reason of the connections provided the bracket 32 and the hose clamps 22 and 24 may pivot freely in respect to each other about the axis of the bolts 30. At the same time the hose reaches or lengths 16 and 18 are maintained in properly spaced relation, axially of the bolts, and this spacing may be adjusted and controlled by the initial setting of the bolts within the threaded sockets of the bracket 32.

The opposite end of the tubular support arm 36 has sliding interconnection with a bracket structure, the details of which are shown in Figs. 5, 7, 8 and 9. More particularly, each hose reach at its end is provided with a suitable coupling structure, as indicated at 38 and 40, by means of which the hose end is interconnected with its corresponding platen jaw in a fluid-tight connection. One portion of the coupling 40 is provided with an extending bracket or arm portion 42, the end of which carries a plate 44 of suitable rectangular shape. This plate is perforated at its opposite ends so as to receive a pair of studs 46 and 48 held in position on the plate by nuts 50.

Supported adjacent the ends of the bolts 46 and 48 is a second rectangular plate member 52. The plates 44 and 52 are maintained in parallel spaced relation by a sleeve 54 encircling the bolt 48, and by a cam or eccentric member 56 encircling the bolt 46, the cam member and spacing sleeve being of the same length.

As best shown in Fig. 5, a control cam member 58 is disposed between the plates 44 and 52, the control cam being slightly narrower than the length of the sleeve 54 and eccentric 56, so as to be freely shiftable between the plates. The control cam is provided with a cross shaped end portion 60, similar to the end 34 of the bracket 32, this squared end portion being fitted into the tubular support arm 36 for free sliding interconnection therewith, as previously mentioned.

Referring particularly to Fig. 8, it will be seen that the control cam 58 is provided with an upper cam surface 62 cooperable with the eccentric 56, and a lower cam surface 64 cooperable with the sleeve member 54. When the platen 10 is in lowered position, the control cam 58 assumes its full line position, as shown in Fig. 8, wherein the cam surface 62 underlies the eccentric 56, and the control cam surface 64 overlies the sleeve 54, so that the eccentric and sleeve form abutments and cooperate to maintain the lefthand end of the control cam in supported position, whereby the control cam may in turn support and hold the tubular arm 36.

By rotational adjustment of the eccentric, the normal or initial positioning of the control cam 58 may be adjusted, so as to correspondingly adjust the initial position of the support arm 36, with the platen 10 in its lowered position. This operation is best illustrated in Fig. 9, one position of the control cam being shown in full lines, and an adjusted position thereof, resulting from rotational adjustment of the eccentric 56, being shown in dotted lines. The eccentric may be conveniently rotatably adjusted by loosening the nuts 50, as will be understood.

The operation of the control cam in respect to the eccentric 56 and sleeve 54, as the platen 10 is raised, is illustrated by the full and dotted lines of Fig. 8. It will be seen that by proper selection of the length of the support arm 36, the weight of the hose pushing downwardly on the outer end of the arm causes the arm to hold the hose properly extended. At the same time, the sliding connections 34—36 and 36—60 permit the hose lengths 16 and 18 to extend if the occasion requires, due to internal pressure, heat, or other causes, free of any restriction by the support structure, whereby to preclude the formation of sag pockets in the hose. As the platen 10 is raised, the cam surfaces 62 and 64 cooperate with the eccentric 56 and sleeve 54 so as to permit the control cam 58 to shift rightwardly to accommodate the shortening of the hose reaches due to the increased bending therein. This movement, however, is of a controlled magnitude at all times, excess inward motion being precluded by the shaping of the cam coupled with the weight factor of the hose.

In the operation of the structure the free pivotal movement of the hose clamps 22 and 24 in respect to each other results in a minimum bending of the hose reaches for any given travel of the platen 10. When the platen is lowered the free pivoting of the hose clamps insures that the hose will return to normal position so that localized pockets or sag portions will not be formed adjacent the hose bight. By adjustment of the eccentric 56 the initial position of the support arm 36 may be controlled, so as to insure proper drainage at all times, and particularly when the platen 10 is lowered. Compensations may also be made for wear and manufacturing tolerances in the fabrication of the parts. The support structure may be readily applied to the hose installation even though the couplings 38 and 40 may be out of line or tilted due to the characteristics of the platens or other machine parts to be connected. The couplings 38 and 40 are interchangeable so that the support plate 44 may be carried by either coupling member. The vertical thickness of the support structure is substantially no greater than that of the hose which facilitates the use of the structure in installations having shallow space requirements.

In Figs. 2, 3 and 4 an installation is illustrated wherein the hose reaches are vertically rather than horizontally aligned. In this instance the relatively shiftable platens or machine parts 70 and 72 are interconnected by a hose structure comprising a pair of reaches or lengths 74 and 76 interconnected by means of a bight portion 78. The bight portion 78 is clamped by means of a clamp structure which may in this instance, Fig.

3, comprise a pair of hose clamp bars 80 and 82 clamped onto the hose by bolts 84. A support bracket or plug 86 is pivotally connected to the hose clamp structure by means of a bolt 88, said plug having a cross sectioned extending portion 90 adapted for interconnection with the tubular support arm 92 in the same manner as previously described in reference to the connection 34—36 in Fig. 5.

The hose reach 76 is connected to the platen 72 by means of a coupling 94 whereas the hose reach 74 is connected to the platen 70 by means of a coupling 96. As best shown in Fig. 4, this latter coupling carries a support plate 44a corresponding in structure and function to the support plate 44 previously described. It will be seen that the remaining elements of the support structure may be the same as in the embodiment previously described, and operating in a similar manner.

It is obvious that various changes may be made in the specific embodiments set forth without departing from the spirit of the invention. The invention is accordingly not to be limited to the specific structures shown and described, but only as indicated in the following claims.

The invention is hereby claimed as follows:

1. A hose support comprising a support bracket, a support arm adapted for connection at one end to a hose length to be supported, and means connecting the other end of said arm to the bracket, said means comprising a pair of spaced abutments mounted on said support, said arm extending between said abutments and in engagement therewith, and a pair of opposed cam surfaces on said arm in constant engagement with said abutments, said abutments and cam surfaces supporting said arm for pivotal and controlled longitudinal shifting movement.

2. A hose support as defined in claim 1, wherein one of said abutments comprises an eccentric sleeve which is rotatable for adjusting the spacing of the abutments relative to each other.

3. A hose support for hose installations of the type comprising a pair of generally parallel hose lengths connected by an intermediate bight portion, said support comprising a support arm extending generally parallel to the hose lengths, means for supporting the arm at one end thereof for pivotal movement about a given axis, and means connecting the other end of the arm to the hose adjacent said bight portion, said connecting means comprising a pair of hose clamps connected respectively to said hose lengths, said clamps being pivotally shiftable relative to each other and to the arm, about axes substantially parallel to said first axis.

4. A hose support for hose installations of the type comprising a pair of generally parallel hose lengths connected by an intermediate bight portion, each hose length comprising a coupling member at the end thereof for connecting the hose to an adjacent machine part, said support comprising a support bracket carried by one of said couplings, a support arm extending generally parallel to the hose lengths and connected at one end to the support bracket, and means connecting the other end of said arm to the hose adjacent said bight portion, and means providing a combined pivotal and slidable interconnection between said arm and said support bracket for connecting the arm to the bracket.

5. A hose support for hose installations of the type comprising a pair of generally parallel hose lengths connected by an intermediate bight portion, and a coupling at the end of each hose length for interconnecting the hose with a pair of adjacent relatively shiftable machine parts, said support comprising a support bracket carried by one of the couplings, a pair of spaced abutments mounted on the support bracket, one of said abutments comprising a cam member shiftable about its axis, a support arm extending generally parallel to the hose lengths, said arm having a pair of spaced cam surfaces adjacent one end thereof in engagement respectively with said abutments, means permitting the adjustment of said cam member relative to its associated cam surface and the other abutment to adjust the position of said arm, and means interconnecting the other end of the arm to the hose adjacent said bight portion.

6. A hose support for hose installations of the type comprising a pair of generally parallel hose lengths connected by an intermediate bight portion, each hose length comprising a coupling member at the end thereof for connecting the hose to an adjacent machine part, said support comprising an inner support bracket fixed in respect to one of said couplings, an outer support bracket fixed to the hose adjacent the bight portion thereof, and a support arm interconnecting said brackets and pivotally connected thereto adjacent its opposite ends, the pivotal connection between the arm and one bracket including cam means and spaced abutments mutually interengaging one another and associated with the adjacent portions of the arm and inner support bracket, said cam means extending diagonally between said spaced abutments and including opposed cam surfaces each in constant engagement with an associated abutment for controlling the pivotal movement of the arm.

7. A hose support comprising a support bracket, a support arm adapted for connection at one end to a hose length to be supported, and means connecting the other end of said support arm to the support bracket for pivotal movement and for shifting movement in a direction longitudinally of the arm, said connecting means including spaced abutments and a cam member extending between the abutments and engaged thereby under reactive weight upon the remote end of the arm for controlling the position of the arm with respect to the support bracket.

References Cited in the file of this patent

UNITED STATES PATENTS

| Number | Name | Date |
|--------|------|------|
| 2,030,218 | Maxwell | Feb. 11, 1936 |
| 2,034,558 | Bronson | Mar. 17, 1936 |
| 2,170,557 | Guarnaschelli | Aug. 22, 1939 |
| 2,175,662 | Guarnaschelli | Oct. 10, 1939 |
| 2,177,128 | Johnson | Oct. 24, 1939 |
| 2,419,860 | Urrutia | Apr. 29, 1947 |